United States Patent [19]

Bittle, Jr.

[11] Patent Number: 4,940,245
[45] Date of Patent: Jul. 10, 1990

[54] ARROW/WOUNDED ANIMAL TRACKING DEVICE

[76] Inventor: Harley E. Bittle, Jr., 1737 Campbell Station Rd., Knoxville, Tenn. 37932

[21] Appl. No.: 253,044

[22] Filed: Oct. 4, 1988

[51] Int. Cl.$^5$ .............................................. H04B 1/034
[52] U.S. Cl. ...................................... 273/416; 455/98; 342/386
[58] Field of Search ........................ 273/416, 418–422; 342/386; 455/98

[56] References Cited

U.S. PATENT DOCUMENTS

| | | | |
|---|---|---|---|
| 3,790,948 | 2/1974 | Ratkovich | 273/416 X |
| 4,421,319 | 12/1983 | Murphy | 273/416 |
| 4,651,999 | 3/1987 | Sturm | 273/416 |
| 4,675,683 | 6/1987 | Robinson et al. | 273/416 X |
| 4,704,612 | 11/1987 | Boy et al. | 273/416 X |
| 4,744,347 | 5/1988 | Dodge | 273/416 X |
| 4,858,935 | 8/1989 | Capson | 273/416 |

Primary Examiner—Paul E. Shapiro
Attorney, Agent, or Firm—Pitts and Brittian

[57] ABSTRACT

A miniaturized electronic transmitter tracking device (10) for mounting on the shaft of a hunting arrow (12) is provided. An integral membrane or diaphragm (38) attaches the transmitter to the arrow (12) in the preferred embodiment and allows the transmitter to break away from the arrow when the arrow strikes some object. A membrane switch (32) is activated when the face plate (40) of the device (10) impacts the animal. Barbed points (42) are driven into the surface of the struck animal by the force of the impact, thus firmly attaching the device (10) to the object. In its preferred embodiment, the transmitter device (10) is used in conjunction with a base receiver (16) to determine the transmitter's location after the arrow (12) has been fired.

6 Claims, 2 Drawing Sheets

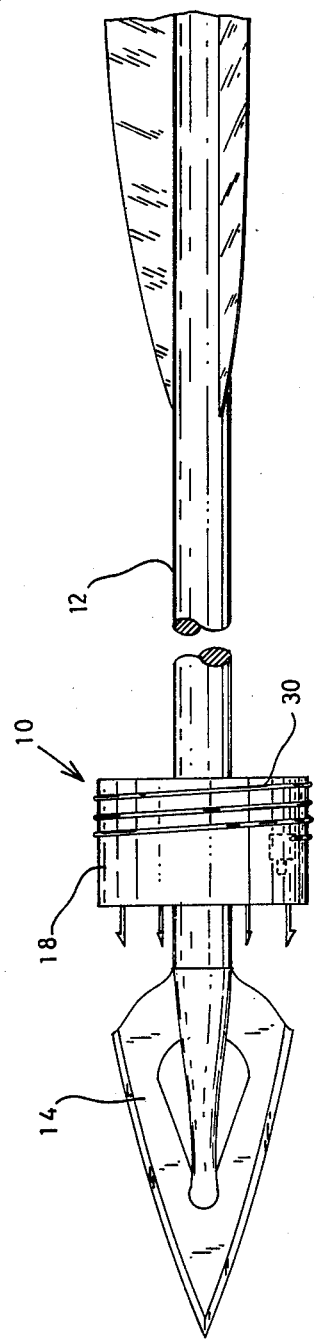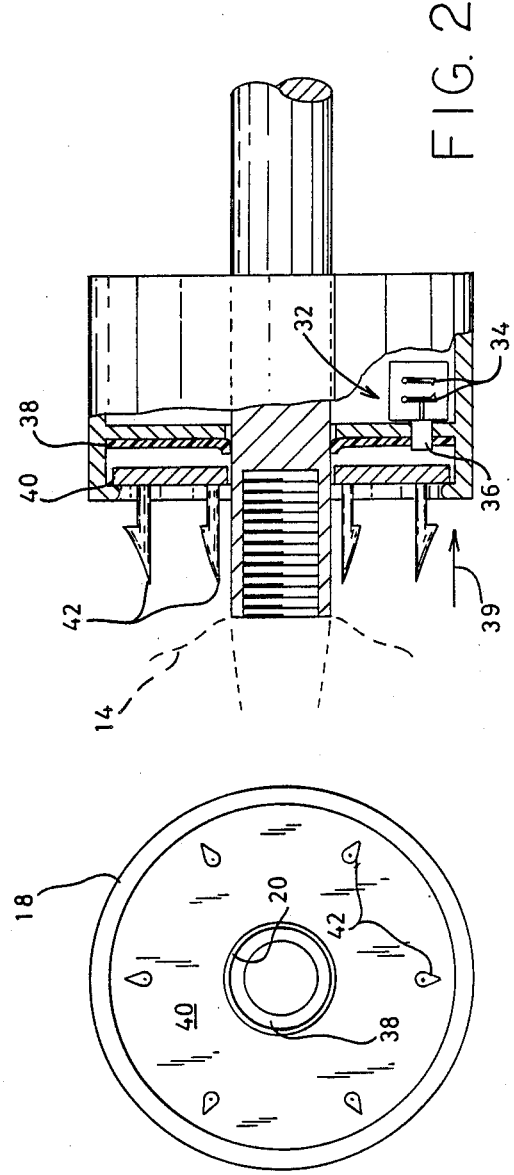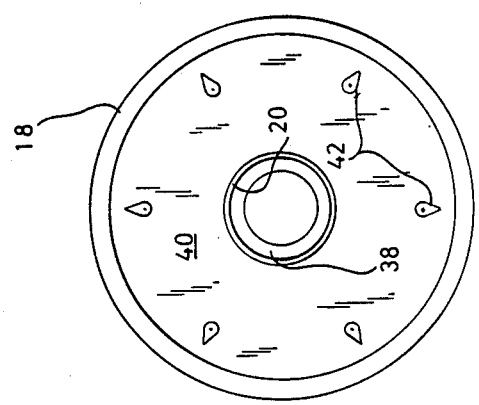

ARROW/WOUNDED ANIMAL TRACKING DEVICE

TECHNICAL FIELD

This invention relates to an arrow tracking device for bow hunters, and more particularly concerns a device which transmits a signal to a base receiver carried by a hunter such that the location of an animal to which the transmitter is attached can be determined.

BACKGROUND ART

Inherent to the sport of hunting game animals with bow and arrow is the possible loss of arrows and/or the targeted game animal. In the former case, the loss of arrows is a matter of some expense which the hunter would like to avoid. In the latter case, the loss of a wounded animal is not only disappointing to the hunter, but may be harmful to the environment. It is certainly wasteful, and quite possibly dangerous. Thus, the need for an effective, reliable method of tracking a hunting arrow and/or the animal that the arrow has wounded has been apparent for some time.

Radio transmitting devices have been used for tracking other devices on which the transmitting devices have been mounted. When the transmitting device is transported from place to place, its location can be discovered by an operator following the transmitting device with a receiver capable of indicating the relative strength of the received signal. As the operator with the receiver comes closer to the transmitting device, the strength of the received signal increases. As the operator modifies his direction of travel in such a manner as to continually increase the indication of the strength of the received signal, the operator can eventually discover the location of the transmitting device and, with it, the transporting means on which said transmitting device was mounted.

It has also been known to use transmitting devices for locating arrows used by game hunters. Known prior art devices are disclosed in the following U.S. Pat. Nos. 3,790,948; 4,421,319; 4,675,683; and 4,704,612. It will be noted that each of these patents discloses a transmitting device which is constructed in combination with a hunter's arrow, i.e., the transmitting device is fixedly secured to the arrow in each of the above disclosures. This feature is a disadvantage since certain modern hunters' bows have the power to drive an arrow entirely through the body of an animal. Accordingly, the known prior art is unable to track an animal wounded by an arrow carrying a transmitting device but which passes through its body.

Accordingly, it is an object of the present invention to provide an arrow/animal tracking device for bow hunters which is releasably attached to the arrow while offering minimal disruption to the arrow's flight and trajectory characteristics.

Another object of the present invention is to provide an improved arrow/wounded animal tracking device which includes the feature of automatically transferring the attachment of the tracking device directly to the animal struck by the arrow.

Yet another object of the present invention is to provide a light weight, battery powered device which is energized upon penetration of the arrow into an animal.

BRIEF DESCRIPTION OF THE DRAWINGS

Other objects and advantages of the arrow/wounded animal tracking device will become apparent upon reading the detailed description together with the drawings described as follows.

FIG. 1 illustrates an arrow/wounded animal tracking device constructed in accordance with various features of the present invention.

FIG. 2 illustrates an enlarged and partially exploded view of the device as it is secured to the arrow, with a portion of the transmitting device housing broken away to illustrate an exemplary switch which energizes the device when it strikes an animal.

FIG. 3 illustrates an end view of the face plate member which transfers the attachment of the arrow tracking device to the object struck.

DISCLOSURE OF THE INVENTION

Figure 4:
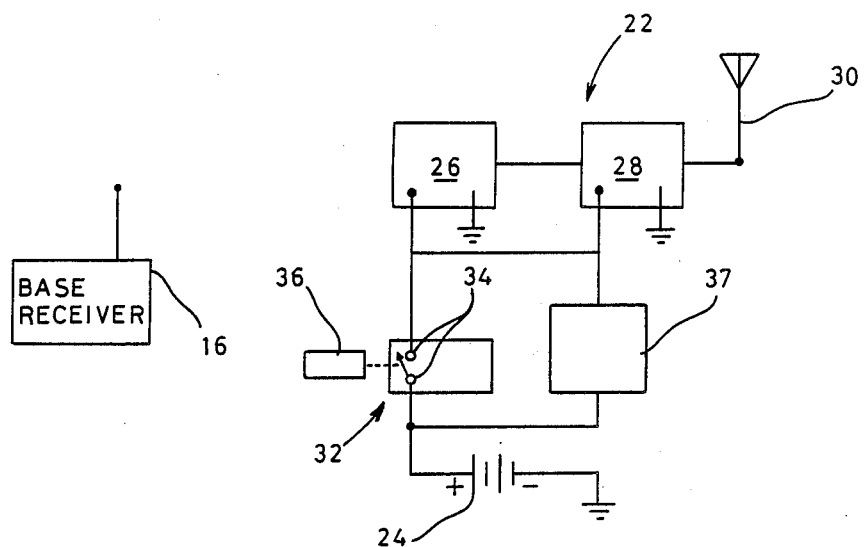
FIG. 4 illustrates a schematic of the transmitting device which generates and radiates a signal to a base receiver carried by a bow hunter.

An arrow/wounded animal tracking device for bow hunters is provided. The device is designed for being used in connection with a base receiver carried by the hunter and includes a power supply which energizes a signal generator. The signal generated is amplified and radiated from the transmitting device such that a hunter carrying a base receiver of conventional design can locate the tracking device. In this regard, the tracking device is releasably secured to the arrow while offering minimal disruption to the arrow's flight and trajectory characteristics. The device is automatically transferred from the arrow to the object, such as a game animal, which is struck by the arrow. Moreover, the device in the preferred embodiment is automatically energized upon penetration of the arrow into the struck object or animal by a preselected amount.

BEST MODE FOR CARRYING OUT THE INVENTION

Referring now to the drawings, an arrow/wounded animal tracking device constructed in accordance with various features of the present invention is illustrated generally at 10 in FIG. 1. It will be noted that the device 10 is releasably mounted on a conventional hunting arrow 12 proximate the head 14. Preferably, the device 10 is used in conjunction with a base receiver 16 (see FIG. 4) of conventional design such as a state-of-the-art radio direction finding receiver.

The device 10 in the illustrated embodiment includes a housing generally indicated at 18 having a toroidal shape and defining a substantially centrally located opening 20 which is proportioned for slidably receiving the shaft of the arrow 12. This housing 18 is fabricated from a substantially rigid or semi-rigid material such as plastic or the like, and serves to carry the electronic components of the device 10.

The electronic components of the device 10 are indicated generally at 22 in FIG. 4. More specifically, a suitable battery 24 serves as a power supply. This battery energizes a signal generator of conventional design illustrated at 26. The signal generated by generator 26 is amplified by a conventional amplifier 28 which also serves as a transmitting device that transmits the signal generated through the antenna illustrated diagrammatically at 30. In the embodiment illustrated in FIG. 1, the antenna 30 comprises a wire which is wrapped about the surface of the housing 18 as shown in FIG. 1. Thus, the signal from amplifier/transmitter 28 is radiated into the air by the wire antenna 30. This signal is received by the base receiver 16 which is aimed by an operator until it points in the direction of the signal's origin, as will be indicated by an increase in the strength of the received signal. The operator then travels in the direction which causes an increase in the indication of the received signal strength until the transmitting device, attached to the animal's body, is found.

Means are provided for automatically energizing the tracking device 10 upon penetration of the arrow into an animal which is struck. In this connection, a switch 32 closes the battery circuit to energize the amplifier/transmitter 28 upon impact and, in the preferred embodiment, the presence of the invention against an animal's body. The illustrated switch 32 comprises a switch of conventional design having contacts shown at 34 in FIG. 2 which are closed by operation of the activator 36. A conventional latching circuit 37 serves to maintain energization of the amplifier/transmitter 28 in the event the switch 32 is opened after impact. In this connection, if the animal continues to run or be active after being wounded, and the switch 34 is thereby opened, the battery circuit will continue to energize the transmitting device 28.

It is desirable that the tracking device 10 remain attached to a wounded animal even if the driving force of the arrow drives it through or deeply into the animal's body. In this connection, means are provided for releasably attaching the tracking device to the arrow in such a manner that offers minimal disruption of the arrow's flight and trajectory characteristics. More specifically, a membrane 38 is used to secure the tracking device to the arrow. This membrane 38 is preferably connected to the housing 18 and serves to mount the housing and the tracking device on the shaft of the arrow 12. More specifically, the membrane 38 is of circular cross-sectional outline in the illustrated embodiment and is provided with a central opening receives the arrow shaft there through. The membrane is designed to break away from the shaft of the arrow upon impact such that the shaft of arrow 12 together with the feathers can slide through the central opening of the housing 18.

Means are also provided for automatically transferring the attachment of the tracking device 10 from the arrow to the animal struck thereby. In this regard, a face plate member 40 is mounted towards the forward portion of the arrow 12. This member 40 is provided with a plurality of barbs 42 in the illustrated embodiment which penetrate the skin of the animal and secure the device 10 thereto when the arrow penetrates the animal to a depth sufficient to allow the barbs 42 to enter the animal skin. It will be noted that the member 40 is substantially circular in cross-sectional outline in the illustrated embodiment and includes a central opening allowing the arrow shaft to slide therethrough upon impact. Also, it will be important for the membrane 38 to provide sufficient support for the device on the arrow to allow the barbs 42 to penetrate the animal's skin prior to transferring said device to the wounded animal.

Upon impact and penetration to a selected depth, the face plate member will be depressed within the housing 18, as is shown by the direction of arrow 39. This face plate will then act against the actuator 36 through the membrane 38 causing the switch 32 to close. The latching circuit 37 will maintain the energization of the transmitter even if the switch is opened again as by the running of an animal.

From the foregoing detailed description, it will be recognized that an improved arrow/wounded animal tracking device has been provided. The tracking device of the present invention is preferably mounted circumferentially on the shaft of a hunting arrow. When the arrow strikes and penetrates an animal, the transmitter is simultaneously energized, detached from the arrow and attached to the struck animal. A signal transmitted from the tracking device is picked up with a base receiver having directional finding characteristics such that the location of the transmitter and the animal to which it is attached can be determined.

It is, of course, understood that although preferred embodiments of the present invention have been illustrated and described, various modifications thereof will be apparent to those skilled in the art and, accordingly, the scope of the present invention should be defined only by the appended claims and equivalents thereof. For example, while an impact type switch is used to energize the amplifier/transmitter, it will be recognized that an inertia switch could be substituted.

I claim:

1. An arrow/wounded animal tracking device for mounting on the shaft of an arrow for use in conjunction with a receiver having directional finding capability, said device comprising:
   a housing defining an opening therethrough for slidably receiving said shaft of said arrow;
   means for releasably securing said housing to said shaft of said arrow as said shaft is received in said opening; and
   signal generating means housed within said housing for generating a signal for being received by said receiver to facilitate the tracking of said arrow/wounded animal.

2. An arrow/wounded animal tracking device for mounting on the shaft of an arrow for use in conjunction with a receiver having directional finding capability, said device comprising:
   a housing defining an opening therethrough for receiving said shaft of said arrow;
   means for releasably securing said housing on said shaft of said arrow said means comprising a membrane mounted in said opening of said housing for circumscribing, and friction-fit engagement of, said shaft of said arrow; and
   signal generating means housed within said housing for generating a signal for being received by said receiver to facilitate the tracking of said arrow/wounded animal.

3. The arrow/wounded animal tracking device of claim 2 wherein said device further comprises switch means for energizing said signal generating means when said arrow impacts an animal, said switch means including a switch for actuating said signal generating means, and including a rearwardly depressible switch actuating member mounted in said forward portion of said housing for engaging said animal upon impact of said arrow with said animal and for engaging and actuating said switch upon being rearwardly depressed, whereby the impact of said actuating member with said animal rearwardly depresses said actuating member thereby actuating said switch.

4. An arrow/wounded animal tracking device for mounting on the shaft of an arrow for use in conjunction with a receiver having directional finding capability, said device comprising:

a housing for being releasably secured on said shaft of said arrow, said housing having a forward portion and a rearward portion;

signal generating means housed within said housing for generating a signal for being received by said receiver to facilitate the tracking of said arrow/wounded animal; and switch means for energizing said signal generating means when said arrow impacts an animal, said switch means including a switch for actuating said signal generating means, and including a rearwardly depressible switch actuating member mounted in said forward portion of said housing for engaging said animal upon impact of said arrow with said animal and for engaging and actuating said switch upon being rearwardly depressed, whereby the impact of said actuating member with said animal rearwardly depresses said actuating member thereby actuating said switch.

5. The arrow/wounded animal tracking device of claim 4 wherein said device further comprises means for the attachment of said housing to said animal.

6. The arrow/wounded animal tracking device of claim 5 wherein said actuating member includes a face plate member and wherein said means for the attachment of said housing to said animal includes at least one forwardly disposed barbed member mounted on said face plate.

* * * * *